UNITED STATES PATENT OFFICE 2,126,793

REMOVING FLUORIDES FROM WATER

Walter H. MacIntire, Knoxville, Tenn.

No Drawing. Application November 12, 1937,
Serial No. 174,203

8 Claims. (Cl. 210—23)

(Granted under the act of March 3, 1883, as
amended April 30, 1928; 370 O. G. 757)

The invention herein described may be manufactured and used by or for the Government for governmental purposes without the payment to me of any royalty thereon.

This invention relates to the art of water purification, particularly the removal of dissolved fluorides from water.

One of the objects of this invention is to remove fluorides or to reduce the fluorine content of water containing the same in solution, to an amount which is below the limit of toxicity for the fluorides in water. Another object of this invention is to provide a convenient and rapid method for removing or reducing the fluorides in water in order that it may be rendered potable. Other objects of this invention include the provision of a method for the economical removal or reduction of fluorides contained in water solutions.

There are numerous areas in the United States in which the water available for general consumption contains a considerable quantity of dissolved fluoride or fluorides with the amount of such dissolved fluorides corresponding to 5 to 15 parts per million of fluorine. It has been found that water containing fluoride corresponding to only 6 parts per million of fluorine results in the universal mottling of the enamel at the time of acquiring permanent teeth which results in premature tooth decay. It is now considered that water containing fluorides less than the equivalent to 1 to 2 parts per million of fluorine is below the limit of toxicity as evidenced by this particular type of malformation.

The generic invention and three specific adaptations are described and claimed in my copending application, Serial No. 164,139, filed September 16, 1937. Another adaptation is described and claimed in this application.

I have discovered a process of removing dissolved fluorides from water by adding at least 30 p. p. m. of orthophosphoric acid to the water for each p. p. m. of fluorine contained in the water; by adding calcium hydroxide to the acidified water in an amount to convert the orthophosphoric acid to tricalcium orthophosphate; and by maintaining the time of contact between the product of the reactants and the water such that the solute fluoride content of the water is reduced below the desired limit for fluorine in the water.

One example of the operation of my process is given for the treatment of water containing 6 p. p. m. of dissolved fluorine and carrying 250 p. p. m. of suspended material. The water was acidified with 190 p. p. m. of orthophosphoric acid. 271 p. p. m. of calcium hydroxide were added to the uniform acidified water and the mixture maintained in an agitated condition for a period of 15 minutes, which, under the conditions, was sufficient to form tricalcium orthophosphate from the reactants and to reduce the fluorine content of the water to 0.5 p. p. m.

It is evident that there are numerous factors which will influence conditions for the most satisfactory operation of my invention, the actual limits of which cannot be established except by a detailed study of each set of raw materials and the finished product involved.

Water containing dissolved fluorides may or may not contain suspended matter. With the amount of suspended matter of the order of 200 p. p. m. and upward, the time required for the contact of the product of the reactants with the water is of the order of 15 to 30 minutes. Where no suspended matter is present, this time of contact under otherwise identical conditions, and as observed in a limited number of cases, is of the order of 10 hours. This time, however, may be materially reduced by the use of an amount of reactants in considerable excess of that otherwise required. It is therefore, necessary, when removing the solute fluoride from water, which is free of suspended matter, to add some suspended matter in order that the removal of the fluorine content of the water may be expedited. This may be accomplished by such means as the addition of finely divided argillaceous material to the water, or by adding to the water a reagent, or reagents, which produce finely divided suspended matter in the water, either for the sole purpose of providing the necessary suspended matter, or for the purpose of treating the water to remove other undesirable constituents. The use of aluminum sulfate with the subsequent product of a floc of aluminum hydroxide is an example of suitable material for accomplishing this result.

The orthophosphoric acid used may be of any suitable commercial concentration. It is preferable to use a commercial orthophosphoric acid free from fluorine. However, should the specific circumstances require the use of an orthophosphoric acid containing fluorine, the amount of fluorine which it contains must be taken into account in addition to the amount of fluorine in the water, insofar as the requirements of orthophosphoric acid and calcium hydroxide are concerned, in calculating the amount of the respective reactants required.

The amount of calcium hydroxide used is at least equivalent to that required to form tricalcium orthophosphate from the orthophosphoric acid used. Under these conditions the treated water resulting will be at least neutral and generally slightly alkaline.

The results of experimental work over a period of several years has led me to believe that the removal of soluble fluorides from water is accomplished largely by the formation of fluorapatite from the tricalcium orthophosphate and the fluoride in the water. The ratio of fluorine to tricalcium orthophosphate required to form fluorapatite is 1:24.5. In order to obtain effective removal of fluorine from water containing solute fluorides, it is necessary to have present at least double the amount of tricalcium orthophosphate theoretically required. Therefore, the minimum requirement for the amount of orthophosphoric acid used is in the order of 30 to 40 p. p. m. for each p. p. m. of fluorine contained in the water.

In the treatment of considerable quantities of water, it is more feasible to carry out this treatment at the prevailing atmospheric temperature. A number of experiments carried out over a period of several years has demonstrated the fact that the removal of fluorine from water containing solute fluorides is materially accelerated by the use of moderately elevated temperatures.

It will be seen, therefore, that this invention actually may be carried out by the use of various modifications and changes without departing from its spirit and scope, with only such limitations placed thereon as are imposed by the prior art.

I claim:

1. Process of removing dissolved fluorides from water, free from suspended matter, to render it potable, which comprises adding at least 200 p. p. m. of suspended matter to the water; adding 30 to 40 p. p. m. of orthophosphoric acid to the water containing the suspended matter, for each p. p. m. of fluorine contained in the water; adding calcium hydroxide to the acidified water in an amount sufficient to convert the orthophosphoric acid to tricalcium orthophosphate; maintaining the time of contact between the product of the reactants and the water such that the solute fluoride content of the water is at least reduced below the limit of toxicity for the fluorides in the water; and settling out the suspended matter from the water.

2. Process of removing dissolved fluorides from water to render it potable, which comprises adding 30 to 40 p. p. m. of orthophosphoric acid to the water, for each p. p. m. of fluorine contained in the water; adding calcium hydroxide to the acidified water in an amount sufficient to convert the orthophosphoric acid to tricalcium orthophosphate; maintaining the time of contact between the product of the reactants and the water such that the solute fluoride content of the water is at least reduced below the limit of toxicity for the fluorides in the water; and separating the water from the residual solid material with which it has been contacted.

3. Process of removing dissolved fluorides from water to render it potable, which comprises adding at least 30 p. p. m. of orthophosphoric acid to the water for each p. p. m. of fluorine contained in the water; adding calcium hydroxide to the acidified water in an amount sufficient to convert the orthophosphoric acid to tricalcium orthophosphate; maintaining the time of contact between the product of the reactants and the water such that the solute fluoride content of the water is at least reduced below the limit of toxicity for the fluorides in the water; and separating the water from the residual solid material with which it has been contacted.

4. Process of removing dissolved fluorides from water, which comprises adding at least 30 p. p. m. of orthophosphoric acid to the water for each p. p. m. of fluorine contained in the water; adding calcium hydroxide to the acidified water in an amount sufficient to convert the orthophosphoric acid to tricalcium orthophosphate; maintaining the time of contact between the product of the reactants and the water such that the solute fluoride content of the water is reduced below the desired limit for fluorine in the water; and separating the water from the residual solid material with which it has been contacted.

5. Process of removing dissolved fluorides from water, free from suspended matter, to render it potable, which comprises forming at least 200 p. p. m. of suspended matter in the water; adding 30 to 40 p. p. m. of orthophosphoric acid to the water containing the suspended matter, for each p. p. m. of fluorine contained in the water; adding calcium hydroxide to the acidified water in an amount sufficient to convert the orthophosphoric acid to tricalcium orthophosphate; and maintaining the time of contact between the product of the reactants and the water such that the solute fluoride content of the water is reduced below the desired limit for fluorine in the water.

6. Process of removing dissolved fluorides from water to render it potable, which comprises adding 30 to 40 p. p. m. of orthophosphoric acid to the water for each p. p. m. of fluorine contained in the water; adding calcium hydroxide to the acidified water in an amount sufficient to convert the orthophosphoric acid to tricalcium orthophosphate; and maintaining the time of contact between the product of the reactants and the water such that the solute fluoride content of the water is at least reduced below the limit of toxicity for the fluorides in water.

7. Process of removing dissolved fluorides from water to render it potable, which comprises adding at least 30 p. p. m. of orthophosphoric acid to the water for each p. p. m. of fluorine contained in the water; adding calcium hydroxide to the acidified water in an amount sufficient to convert the orthophosphoric acid to tricalcium orthophosphate; and maintaining the time of contact between the product of the reactants and the water such that the solute fluoride content of the water is at least reduced below the limit of toxicity for the fluorides in water.

8. Process of removing dissolved fluorides from water, which comprises adding at least 30 p. p. m. of orthophosphoric acid to the water for each p. p. m. of fluorine contained in the water; adding calcium hydroxide to the acidified water in an amount sufficient to convert the orthophosphoric acid to tricalcium orthophosphate; and maintaining the time of contact between the product of the reactants and the water such that the solute fluoride content of the water is reduced below the desired limit for fluorine in the water.

WALTER H. MacINTIRE.